United States Patent
Colella et al.

(10) Patent No.: US 12,141,059 B2
(45) Date of Patent: *Nov. 12, 2024

(54) DATA SEPARATION FOR GARBAGE COLLECTION

(71) Applicant: Micron Technology, Inc., Boise, ID (US)

(72) Inventors: Nicola Colella, Capodrise (IT); Antonino Pollio, Vico Equense (IT)

(73) Assignee: Micron Technology, Inc., Boise, ID (US)

( * ) Notice: Subject to any disclaimer, the term of this patent is extended or adjusted under 35 U.S.C. 154(b) by 66 days.

This patent is subject to a terminal disclaimer.

(21) Appl. No.: 18/058,132

(22) Filed: Nov. 22, 2022

(65) Prior Publication Data
US 2023/0161696 A1    May 25, 2023

Related U.S. Application Data

(63) Continuation of application No. 16/918,333, filed on Jul. 1, 2020, now Pat. No. 11,513,952.

(51) Int. Cl.
*G06F 12/00* (2006.01)
*G06F 12/02* (2006.01)

(52) U.S. Cl.
CPC .... *G06F 12/0253* (2013.01); *G06F 2212/702* (2013.01); *G06F 2212/7205* (2013.01)

(58) Field of Classification Search
CPC ............. G06F 12/0253; G06F 12/0238; G06F 2212/702; G06F 2212/7205; G06F 3/0646
See application file for complete search history.

(56) References Cited

U.S. PATENT DOCUMENTS

| | | | |
|---|---|---|---|
| 5,530,850 A | 6/1996 | Ford et al. | |
| 9,558,112 B1 | 1/2017 | Borchers | |
| 9,747,202 B1 | 8/2017 | Shaharabany et al. | |
| 9,940,063 B2 * | 4/2018 | Choi | G06F 3/061 |
| 10,101,942 B1 | 10/2018 | Parker et al. | |

(Continued)

FOREIGN PATENT DOCUMENTS

CN    110928805 A    3/2020

OTHER PUBLICATIONS

Chen et al., "2F: A Special Cache for Mapping Table of Page-level Flash Translation Layer", 2010 16th International Conference on Parallel and Distributed Systems, IEEE, 2010, pp. 585-592. (Year: 2010).

(Continued)

*Primary Examiner* — Shawn X Gu
(74) *Attorney, Agent, or Firm* — Holland & Hart LLP

(57) ABSTRACT

Methods, systems, and devices for data separation for garbage collection are described. A control component coupled to the memory array may identify a source block for a garbage collection procedure. In some cases, a first set of pages of the source block may be identified as a first type associated with a first access frequency and a second set of pages of the source block ay be identified as a second type associated with a second access frequency. Once the pages are identified as either the first type or the second type, the first set of pages may be transferred to a first destination block, and the second set of pages may be transferred to a second destination block as part of the garbage collection procedure.

20 Claims, 6 Drawing Sheets

(56) References Cited

U.S. PATENT DOCUMENTS

| | | | |
|---|---|---|---|
| 10,740,016 | B2 | 8/2020 | White et al. |
| 11,513,952 | B2 * | 11/2022 | Colella ............... G06F 12/0246 |
| 2012/0023144 | A1 | 1/2012 | Rub |
| 2014/0059279 | A1 | 2/2014 | He et al. |
| 2014/0164687 | A1 | 6/2014 | Kwon et al. |
| 2015/0213107 | A1 | 7/2015 | Park et al. |
| 2015/0324284 | A1 | 11/2015 | Kim et al. |
| 2015/0347013 | A1 | 12/2015 | Mathur et al. |
| 2016/0124848 | A1 | 5/2016 | Bellorado et al. |
| 2016/0139812 | A1 | 5/2016 | Zhang |
| 2016/0357480 | A1 | 12/2016 | Choi |
| 2017/0060738 | A1 | 3/2017 | Shaharabany et al. |
| 2017/0123972 | A1 | 5/2017 | Gopinath et al. |
| 2019/0332531 | A1 | 10/2019 | Xu et al. |
| 2020/0073798 | A1 | 3/2020 | Cho |
| 2020/0097400 | A1 | 3/2020 | Lee |
| 2020/0097403 | A1 | 3/2020 | Saxena et al. |
| 2021/0042239 | A1 | 2/2021 | Ioannou et al. |
| 2021/0124488 | A1 | 4/2021 | Stoica et al. |
| 2021/0173776 | A1 | 6/2021 | Li |
| 2021/0286555 | A1 | 9/2021 | Li |

OTHER PUBLICATIONS

Chinese patent office, "China Office Action," issued in connection with China Patent Application No. 202110743910.9 dated Nov. 11, 2023 (15 pages) (7 pages of English Translation and 8 pages of Original Document).

* cited by examiner

DATA SEPARATION FOR GARBAGE COLLECTION

CROSS REFERENCES

The present Application for Patent is a continuation of U.S. patent application Ser. No. 16/918,333 by Colella et al., entitled "DATA SEPARATION FOR GARBAGE COLLECTION," filed Jul. 1, 2020, which is assigned to the assignee hereof and which is expressly incorporated by reference herein.

BACKGROUND

The following relates generally to one or more systems for memory and more specifically to data separation for garbage collection.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D Xpoint), not-or (NOR), and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
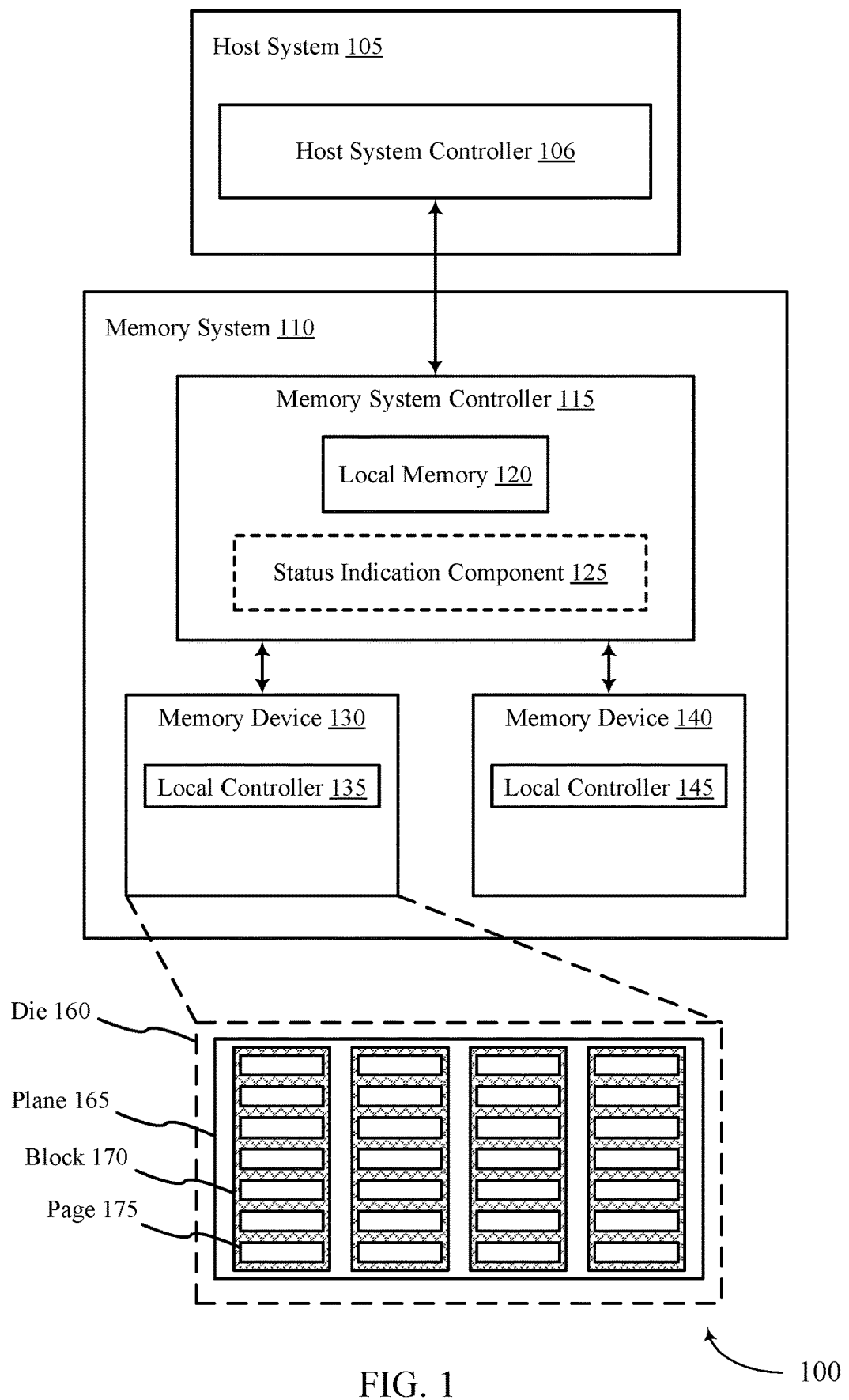
FIG. 1 illustrates an example of a system that supports data separation for garbage collection in accordance with examples as disclosed herein.

In some garbage collection procedures, a block may include pages of valid data and invalid (e.g., old data that was previously written but is no longer associated with a valid logical address, such as a logical address referenced by a host system in a logical-to-physical (L2P) mapping table). A block may also include pages with valid data, and pages that contain no data. During garbage collection, valid data of the block to be erased is initially read into and stored by a buffer based on one or more read commands issued by a memory system controller and the corresponding block (e.g., the block on which the valid data is contained) is erased. The valid data may then be written (e.g., re-written) to the memory system (e.g., to a different page of the memory system). In order to write the valid data to a location (e.g., a different page of the memory system), write commands may be issued by the controller, each write command indicating an address (e.g., a destination address) to which the valid data is to be written. In some garbage collection procedures, the write commands are issued once the corresponding read command has been completed. That is, a read command for data at a source address (e.g., an address on a page to be erased).

In some cases, the memory system may be configured to store information on behalf of a host system. Such host system may issue write commands or read commands to access the memory system. In some cases, to facilitate performance of the memory system, one or more management operations (e.g., garbage collection operations) may be performed at the same time that the host-initiated access operations are performed. Such procedures may result in more data being written or read in the memory system than what was requested by the host system. Such techniques (e.g., using an increased amount of management operations) may result in the memory system experiencing a performance loss when performing a garbage collection procedure, which may increase the latency for other operations related to the host system. The memory system may use an increased amount of management operations that may decrease the overall performance of the memory system, which may result in a host system experiencing impaired read, write, and erase speeds. Techniques to reduce the amount of management operations that the memory system performs may be desired.

Aspects of the present disclosure address the above and other deficiencies by having a memory system that includes a smart garbage collection procedure. The garbage collection procedure may determine an access history (e.g., frequency of accesses) of logical block addresses (LBA) through the use of a PPT (Logical to Physical address translation) table. In such cases, the LBAs may be separated based on the write access frequency. For example, the memory system may separate frequently accessed data (e.g., hot data) and less-frequently accessed data (e.g., cold data) into different portions of the memory array. Once the data is separated, management operations may be performed more frequently for the frequently accessed data (e.g., the hot data), while management operations may be performed less frequently for the less-frequently accessed data (e.g., the cold data).

In such cases, the amount of management operations performed may be reduced. By separating the data based on access frequency, the overall performance of the memory system may increase. For example, separating data for garbage collection may improve the overall efficiency of the memory system, which may result in the memory system experiencing improved read, write, and erase speeds, reduced power consumption, improved processing times, and the like.

Features of the disclosure are initially described in the context of a system as described with reference to FIG. 1. Features of the disclosure are described in the context of block diagrams as described with reference to FIGS. 2-4. These and other features of the disclosure are further illustrated by and described with reference to an apparatus diagram and a flowchart that relate to data separation for garbage collection as described with reference to FIGS. 5-6.

FIG. 1 illustrates an example of a system 100 that supports data separation for garbage collection in accordance with examples as disclosed herein. The system 100 includes a host system 105 coupled with a system 110.

A system 110 may be or include any device or collection of devices, where the device or collection of devices includes at least one memory array. For example, a system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the system 110. The host system 105 may include one or more devices, and in some cases may include a processor chipset and a software stack executed by the processor chipset. For example, the host system 105 may include an application configured for communicating with the system 110 or a device therein. The processor chipset may include one or more cores, one or more caches (e.g., memory local to or included in the host system 105), a controller (e.g., NVDIMM controller), and a storage protocol controller (e.g., PCIe controller, SATA controller). The host system 105 may use the system 110, for example, to write data to the system 110 and read data from the system 110. Although one system 110 is shown in FIG. 1, it is to be understood that the host system 105 may be coupled with any quantity of systems 110.

The host system 105 may be coupled with the system 110 via at least one physical host interface. The host system 105 and the system 110 may in some cases be configured to communicate via a physical host interface using an associated protocol (e.g., to exchange or otherwise communicate control, address, data, and other signals between the system 110 and the host system 105). Examples of a physical host interface may include, but are not limited to, a serial advanced technology attachment (SATA) interface, a UFS interface, an eMMC interface, a peripheral component interconnect express (PCIe) interface, USB interface, Fiber Channel, Small Computer System Interface (SCSI), Serial Attached SCSI (SAS), Double Data Rate (DDR), a dual in-line memory module (DIMM) interface (e.g., DIMM socket interface that supports DDR), Open NAND Flash Interface (ONFI), Low Power Double Data Rate (LPDDR). In some examples, one or more such interfaces may be included in or otherwise supported between a host system controller 106 of the host system 105 and a system controller 115 of the system 110. In some examples, the host system 105 may be coupled with the system 110 (e.g., the host system controller 106 may be coupled with the system controller 115) via a respective physical host interface for each memory device 130 or memory device 140 included in the system 110, or via a respective physical host interface for each type of memory device 130 or memory device 140 included in the system 110.

System 110 may include a system controller 115, a memory device 130, and a memory device 140. A memory device 130 may include one or more memory arrays of a first type of memory cells (e.g., a type of non-volatile memory cells), and a memory device 140 may include one or more memory arrays of a second type of memory cells (e.g., a type of volatile memory cells). Although one memory device 130 and one memory device 140 are shown in the example of FIG. 1, it is to be understood that system 110 may include any quantity of memory devices 130 and memory devices 140, and that, in some cases, system 110 may lack either a memory device 130 or a memory device 140.

The system controller 115 may be coupled with and communicate with the host system 105 (e.g., via the physical host interface). The system controller 115 may also be coupled with and communicate with memory devices 130 or memory devices 140 to perform operations such as reading data, writing data, erasing data, or refreshing data at a memory device 130 or a memory device 140, and other such operations, which may generically be referred to as access operations. In some cases, the system controller 115 may receive commands from the host system 105 and communicate with one or more memory devices 130 or memory devices 140 to execute such commands (e.g., at memory arrays within the one or more memory devices 130 or memory devices 140). For example, the system controller 115 may receive commands or operations from the host system 105 and may convert the commands or operations into instructions or appropriate commands to achieve the desired access of the memory devices 130 or memory devices 140. And in some cases, the system controller 115 may exchange data with the host system 105 and with one or more memory devices 130 or memory devices 140 (e.g., in response to or otherwise in association with commands from the host system 105). For example, the system controller 115 may convert responses (e.g., data packets or other signals) associated with the memory devices 130 or memory devices 140 into corresponding signals for the host system 105.

The system controller 115 may be configured for other operations associated with the memory devices 130 or memory devices 140. For example, the system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 105 and physical addresses (e.g., physical block addresses) associated with memory cells within the memory devices 130 or memory devices 140.

The system controller 115 may include hardware such as one or more integrated circuits or discrete components, a buffer memory, or a combination thereof. The hardware may include circuitry with dedicated (e.g., hard-coded) logic to perform the operations ascribed herein to the system controller 115. The system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The system controller 115 may also include a local memory 120. In some cases, the local memory 120 may include read-only memory (ROM) or other memory that may store operating code (e.g., executable instructions) executable by the system controller 115 to perform functions ascribed herein to the system controller 115. In some cases, the local memory 120 may additionally or alternatively include static random access memory (SRAM) or other memory that may be used by the system controller 115 for internal storage or calculations, for example, related to the functions ascribed herein to the system controller 115. Additionally or alternatively, the local memory 120 may serve as a cache for the system controller 115. For example, data may be stored to the local memory 120 when read from or written to a memory device 130 or memory device 140, and may be available within the local memory 120 for subsequent retrieval for or manipulation (e.g., updating) by the host system 105 (e.g., with reduced latency relative to a memory device 130 or memory device 140) in accordance with a cache policy.

Although the example of system 110 in FIG. 1 has been illustrated as including the system controller 115, in some cases, a system 110 may not include a system controller 115. For example, the system 110 may additionally or alternatively rely upon an external controller (e.g., implemented by the host system 105) or one or more local controllers 135 or local controllers 145, which may be internal to memory devices 130 or memory devices 140, respectively, to perform the functions ascribed herein to the system controller 115. In general, one or more functions ascribed herein to the system controller 115 may in some cases instead be performed by the host system 105, a local controller 135, or a local controller 145, or any combination thereof.

A memory device 140 may include one or more arrays of volatile memory cells. For example, a memory device 140 may include random access memory (RAM) memory cells, such as dynamic RAM (DRAM) memory cells and synchronous DRAM (SDRAM) memory cells. In some examples, a memory device 140 may support random access operations (e.g., by the host system 105) with reduced latency relative to a memory device 130, or may offer one or more other performance differences relative to a memory device 130.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM).

In some examples, a memory device 130 or a memory device 140 may include (e.g., on a same die or within a same package) a local controller 135 or a local controller 145, respectively, which may execute operations on one or more memory cells of the memory device 130 or the memory device 140. A local controller 135 or a local controller 145 may operate in conjunction with a system controller 115 or may perform one or more functions ascribed herein to the system controller 115. In some cases, a memory device 130 or a memory device 140 that includes a local controller 135 or a local controller 145 may be referred to as a managed memory device and may include a memory array and related circuitry combined with a local (e.g., on-die or in-package) controller (e.g., local controller 135 or local controller 145). An example of a managed memory device is a managed NAND (MNAND) device.

In some cases, a memory device 130 may be or include a NAND device (e.g., NAND flash device). The memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they may be re-written with new data. Thus, example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the system controller 115 may mark or otherwise designate the data that remains in the old block 170 as invalid or obsolete, and update an L2P mapping table to associate the logical address (e.g., LBA) for the data with the new, valid block 170 rather than the old, invalid block 170. In some cases, such copying and remapping may be preferable to erasing and rewriting the entire old block 170, due to latency or wear considerations, for example. In some cases, one or more copies of an L2P mapping table may be stored within the memory cells of the memory device 130 (e.g., within or more blocks 170 or planes 165) for use (e.g., reference and updating) by the local controller 135 or system controller 115.

In some cases, L2P tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has not been written to or that has been erased.

In some cases, a system controller 115, a local controller 135, or a local controller 145 may perform operations (e.g., as part of one or more media management algorithms) for a memory device 130 or a memory device 140, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support data separation for garbage collection. For example, the host system 105, the system controller 115, a memory device 130, or a memory device 140 may include or otherwise may access one or more non-transitory computer readable media storing instructions (e.g., firmware) for performing the functions ascribed herein to the host system 105, system controller 115, memory device 130, or memory device 140. For example, such instructions, when executed by the host system 105 (e.g., by the host system controller 106), by the system controller 115, by a memory device 130 (e.g., by a local controller 135), or by a memory device 140 (e.g., by a local controller 145), may cause the host system 105, system controller 115, memory device 130, or memory device 140 to perform associated functions as described herein.

In some cases, memory device 130 may identify a source block (e.g., block 170) for a garbage collection procedure. The source block may include a plurality of pages 175. The memory device 130 may identify a first set of pages 175 of the source block as a first type (e.g., cold data that is accessed relatively less frequently) and identify a second set of pages 175 of the source block as a second type (e.g., hot data that is accessed relatively frequently). In such cases, the first type may be associated with a frequency of accessing the first set of pages 175, and the second type may be associated with a frequency of accessing the second set of pages 175.

The garbage collection procedure may use the access frequency to separate less-frequently accessed data (e.g., the first type) and frequently accessed data (e.g., the second type) into different portions of the memory array. For example, the memory device 130 may transfer the first set of pages 175 indicative of less-frequently accessed data to a destination block (e.g., block 170) and transfer the second set of pages 175 indicative of frequently accessed data to a different destination block (e.g., block 170) as part of the garbage collection procedure. In such cases, management operations may be performed more frequently for the frequently accessed data (e.g., the second type), while management operations may be performed less frequently for the less-frequently accessed data (e.g., the first type), thereby reducing the amount of management operations performed. Based on separating the data, the memory device may include the first type in the garbage collection procedure.

Figure 2:
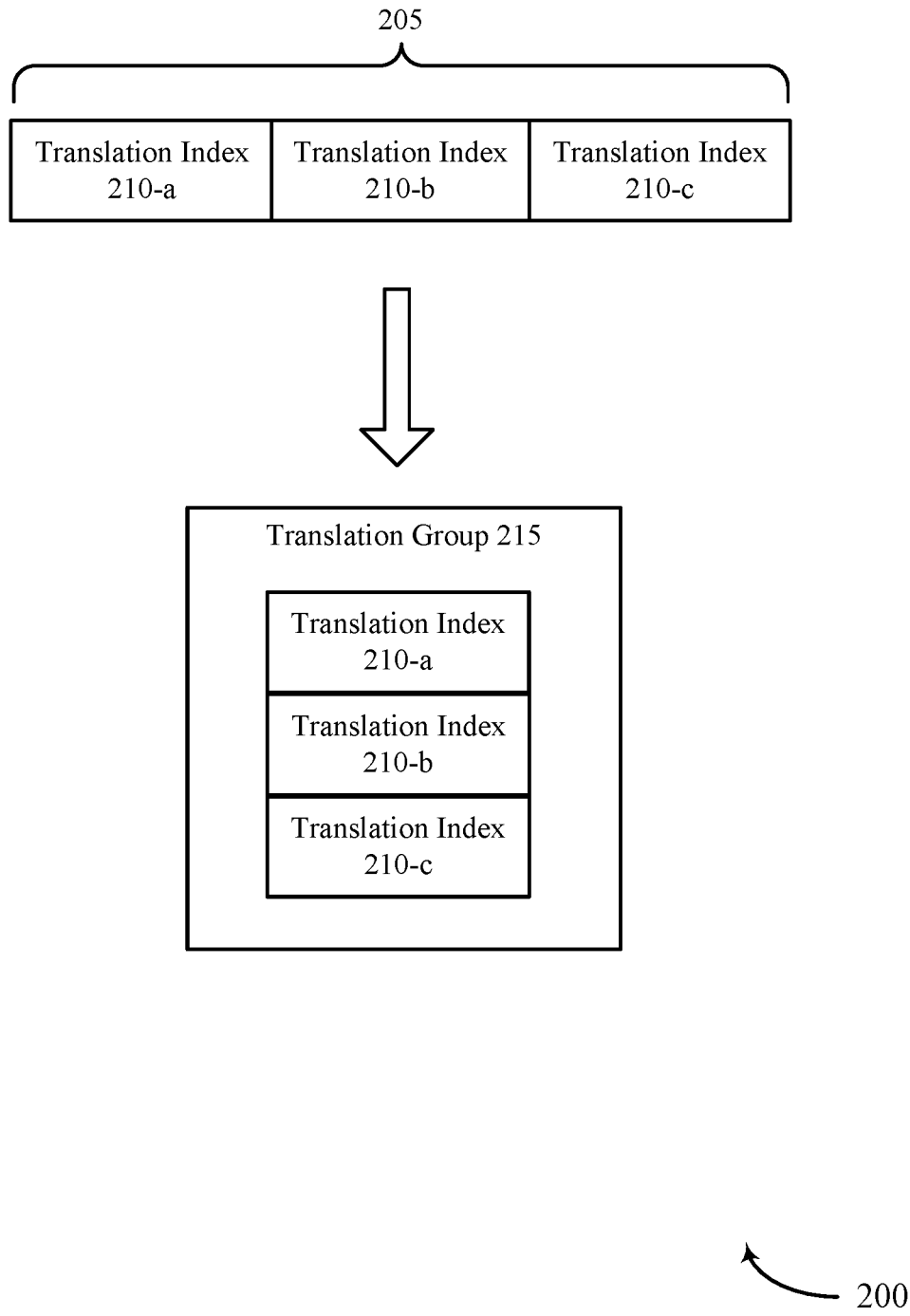
FIG. 2 illustrates an example of a block diagram that supports data separation for garbage collection in accordance with examples as disclosed herein.

FIG. 2 illustrates an example of a block diagram 200 that supports data separation for garbage collection in accordance with examples as disclosed herein. The block diagram 200 may include a PPT table 205, translation indexes 210 (e.g., PPT indexes), and a translation group (e.g., PPT group).

The host system may issue write commands or read commands to access the memory system. In some cases, the total bytes written (TBW) may represent an amount of data that a host system may write until a program/erase (PE) operation may be performed. Management operations may be performed at the same time as the host-initiated operations (e.g., host-initiated write operations) are performed. Such procedures may result in an increased amount of TBW as more data may be written or read in the memory system than what was requested by the host system. Techniques to increase the amount of TBW while maintaining the management operations of the memory system may be desired.

The TBW may be dependent on the capability of the system to perform PE operations. In some cases, TBW may be dependent on the write amplification factor (WAF). The WAF may be an example of a comparison (e.g., a ration) between the amount of data written in the memory system and the amount of data requested by the host system. In some systems, the WAF may be greater than 1 (e.g., the amount of data written in the memory system is more than the amount of data written by the host system) due to increased amount of management operations that may be performed at a same time as the host-initiated operations. Techniques to increase the amount of TBW while maintaining the management operations of the memory system may improve the efficiency of a garbage collection procedure, thereby reducing the WAF and increasing the TBW. In such cases, reducing an amount of management operations that occur during a write operation may enable the memory system to write an increased amount of host data rather than management operations.

In some examples, the efficiency of the garbage collection procedure may be improved by determining a write access history (e.g., frequency) of the LBAs through the use of the PPT table 205. The PPT table 205 may be used to translate a logical address to a physical address. The PPT table 205 may include a plurality of translation indexes 210 (e.g., translation index 210-a, 210-b, and 210-c). In such cases, the PPT table 205 may address an LBA range including the translation indexes 210 to maintain the logical to physical conversion.

One or more PPT tables 205 may be merged into a translation group 215, thereby reducing a quantity of individual updates for each PPT table 205. For example, a translation index 210 of the PPT table 205 may be updated with incoming data from the host system. After updating the information (e.g., a correlation between physical address and logical address) associated with the translation index 210, the translation group 215 may be updated based on the presence of the updated translation index 210 within the translation group 215. In such cases, the updates associated with the PPT table 205 may be associated with translation group 215. The memory system may generate the translation group 215 which may include translation indexes 210-a, 210-b, and 210-c. In some cases, translation indexes 210-a, 210-b, and 210-c of the translation group 215 may each be associated with one or more pages. The memory system may identify a translation group 215 associated with a write operation for one or more pages.

In some examples, the memory system may include different translation indexes 210 (e.g., PPT index) and a corresponding different size of the translation group 215 (e.g., PPT group) as identified in TABLE 1.

TABLE 1

| Density [GB] | PPT index (4M) | PPT size (MB) | PPT Group (32 MB) |
|---|---|---|---|
| 64 | 16384 | 64 | 2048 |
| 128 | 32768 | 128 | 4096 |
| 256 | 65536 | 256 | 8192 |
| 512 | 131072 | 512 | 16384 |

To accommodate the updates to translation group 215, a first-in, first-out (FIFO) queue may be used and defined for a quantity of records (e.g., 64 records, 128 records, 256 records, 512 records, etc.). In such cases, the quantity of records may be used to track the frequently used translation groups 215. In some cases, bits 14 through 0 may be used to store the index of the translation group 215, and bit 15 may be used to identify a characteristic of the translation group 215.

Figure 3:
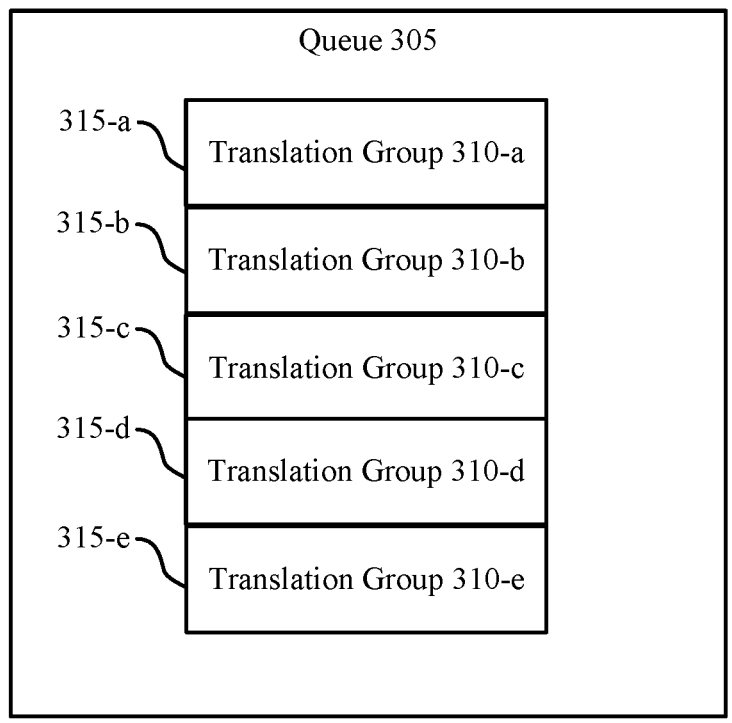
FIG. 3 illustrates an example of a first-in first-out (FIFO) structure that supports data separation for garbage collection in accordance with examples as disclosed herein.

FIG. 3 illustrates an example of a FIFO structure 300 that supports data separation for garbage collection in accordance with examples as disclosed herein. The FIFO structure 300 may include a queue 305 and translation groups 310. Each translation group 310 may be associated with a position 315. Translation groups 310 may be an example of translation group 215 described with reference to FIG. 2.

The queue 305 may include one or more translation groups 310. The memory system may identify that the translation groups 310 are associated with valid pages. For example, the translation groups 310 may each include one or more translation indexes associated with one or more valid pages. The queue 305 may include positions 315. For example, translation group 310-a may be associated with a first position in the queue 305 (e.g., position 315-a), translation group 310-b may be associated with a second position in the queue 305 (e.g., position 315-b), translation group 310-c may be associated with a third position in the queue 305 (e.g., position 315-c), translation group 310-d may be associated with a fourth position in the queue 305 (e.g., position 315-d), and translation group 310-e may be associated with a fifth (e.g., last) position in the queue 305 (e.g., position 315-e).

The queue 305 may be loaded into a shared memory (e.g., SRAM) buffer after the memory system powers up or after the memory system exits a sleep cycle. In some cases, the memory system may flush the data associated with page of one of the translation groups 310. For example, the memory system may access a page after generating the translation group 310. During a synchronization event, the memory system may receive a write command, and the memory system may identify which translation group 310 in the queue 305 includes the translation index associated with the write command (e.g., accessing the page). The translation group 310 associated with the accessed translation index may be updated, thereby updating the queue 305. For example, the translation group 310 may be moved to a higher position or to the top of the queue 305 when the translation index in the translation group 310 is accessed (e.g., via a write operation). When the memory system receives a new command (e.g., access command), the translation group 310 may be inserted into the head of the queue 305 (e.g., position 315-a) or the translation group 310 may move to position 315-a if the translation group 310 is already present in the queue 305. In some cases, when the translation index in the translation group 310 is accessed via a read operation, the translation group 310 may remain in the same position prior to being accessed by the read operation. In such cases, the read operation may not change the position of the translation groups 310 within the queue 305.

In one example, a page associated with a translation index of translation group 310-b may be accessed. In such cases, the translation group 310-b may move from position 315-b to position 315-a within the queue 305 and translation group 310-a may move from position 315-a to position 315-b within the queue 305. In another example, a page associated with a translation index of translation group 310-c may be accessed. In such cases, the translation group 310-c may move from position 315-c to position 315-a within the queue 305 and translation group 310-b may move from position 315-b to position 315-c within the queue 305. In some cases, translation groups may be removed from the queue 305, if other translation groups are added to the queue 305 and the queue has reached its capacity (e.g., 256 records). In such cases, the memory system may reposition (e.g., update) the position 315 of the translation group 310 within the queue 305 based on accessing the page.

The memory system may determine a type of translation group 310 based on whether the translation group is part of the queue 305 or is not part of the queue 305. For example, if a translation group 310 is included in the queue 305 then it may be classified as hot data and if the translation group 310 is not included in the queue 305 it may be classified as cold data. In some cases, the memory system may determine a type of translation group 310 based on a position within the queue 305. For example, the memory system may determine whether the translation group 310 is a first type associated with a first access frequency or a second type associated with a second access frequency based on one or more position thresholds associated with the queue 305. In some examples, the translation group 310 may be in a higher position in the queue 305 if accessed frequently and a lower position in the queue 305 if accessed less frequently. In such cases, the most recently updated translation group 310 may be positioned at the top of the queue 305 (e.g., position 315-a) and determined to be the second type associated with the second access frequency. A less recently updated translation group 310 may be positioned at (or near) the bottom of the queue 305 (e.g., position 315-e) and determined to be the first type associated with the first access frequency. In some cases, rarely accessed translation groups 310 may not be positioned within the queue 305 and determined to be the first type associated with the first access frequency. Identifying a position 315 of the translation group 310 within the queue 305 may be used identify a type of data associated with the pages as the first type or the second type. For example, a position 315 of the translation group 310 within the queue 305 may be compared with one or more thresholds to identify the translation group as the first type or the second type. The pages associated with the translation indexes included in the translation group 310-a may be identified as hot data that is accessed more frequently than cold data.

In some cases, translation groups not present in the queue 305 may be identified as the first type. The pages associated with the translation indexes included in the translation group 310-e may be identified as cold data that is accessed less frequently than hot data. As described below in more detail, the hot data and cold data may be separated during the garbage collection procedure to increase efficiency and improve the operations of the memory system.

The memory system may determine that the first type is accessed less recently and/or less frequently (e.g., cold data). For example, the memory system may determine the first access frequency based on determining that a quantity of times the pages are accessed is below an access frequency threshold. The memory system may determine that the second type is accessed more recently and/or more frequently (e.g., hot data). For example, the memory system may determine the second access frequency based on determining that a quantity of times the pages are accessed is above the access frequency threshold.

In some cases, the memory system may determine whether the translation group 310 is included in the queue 305. For example, the memory system may determine that the translation groups 310-a, 310-b, 310-c, 310-d, and 310-e are included in the queue 305. In some cases, translation groups 310 identified as the second type may be present in the queue 305 while translation groups 310 identified as the first type may be absent from the queue 305. For example, the memory system may determine that the translation group 310 is not included in the queue 305. In such cases, the memory system may determine that the translation indexes associated with the one or more pages are unassigned to the translation group 310 in the queue 305 and identify the data as the first type.

The queue 305 may include a translation group 310 of a third type based on a position 315 within the queue 305. For example, translation groups updated more than the first type and less than the second type may be identified as the third type (e.g. warm data). The warm data may be positioned between the hot data (e.g., position 315-a) and the cold data (e.g., position 315-e). In some examples, the warm data may be positioned at the bottom of the queue 305 (e.g., position 315-e). The hot data may be positioned in any one of positions 315-a, 315-b, 315-c, 315-d, and 315-e. The warm data may be positioned in any one of positions 315-b, 315-c, 315-d, and 315-e. The cold data may be positioned in position 315-e or may be absent from the queue 305.

In some cases, a new translation group 310 may be placed into the queue 305. In such cases, a translation group 310 previously present in the queue 305 may be moved up in the queue 305 based on accessing a page associated with the translation group or may be moved down in the queue 305 based on accessing a page less frequently than the new translation group 310. In some examples, the new translation group 310 may be associated with an incoming host write operation. In such cases, the new translation group 310 may be placed in the top position (e.g., position 315-a) within the queue 305. When a new translation group 310 may be placed into the queue 305, the translation group in position 315-e (e.g., translation group 310-e) may exit the queue 305. In such cases, the translation group 310-e discarded from the queue may be identified as the first type (e.g., cold data) such that the data updates less frequently than data associated with the other translation groups 310. Some examples describe the first type of data as being cold data and the second type of data as being hot data. In other examples, the first type of data may be hot data and the second type of data may be cold data.

Figure 4:
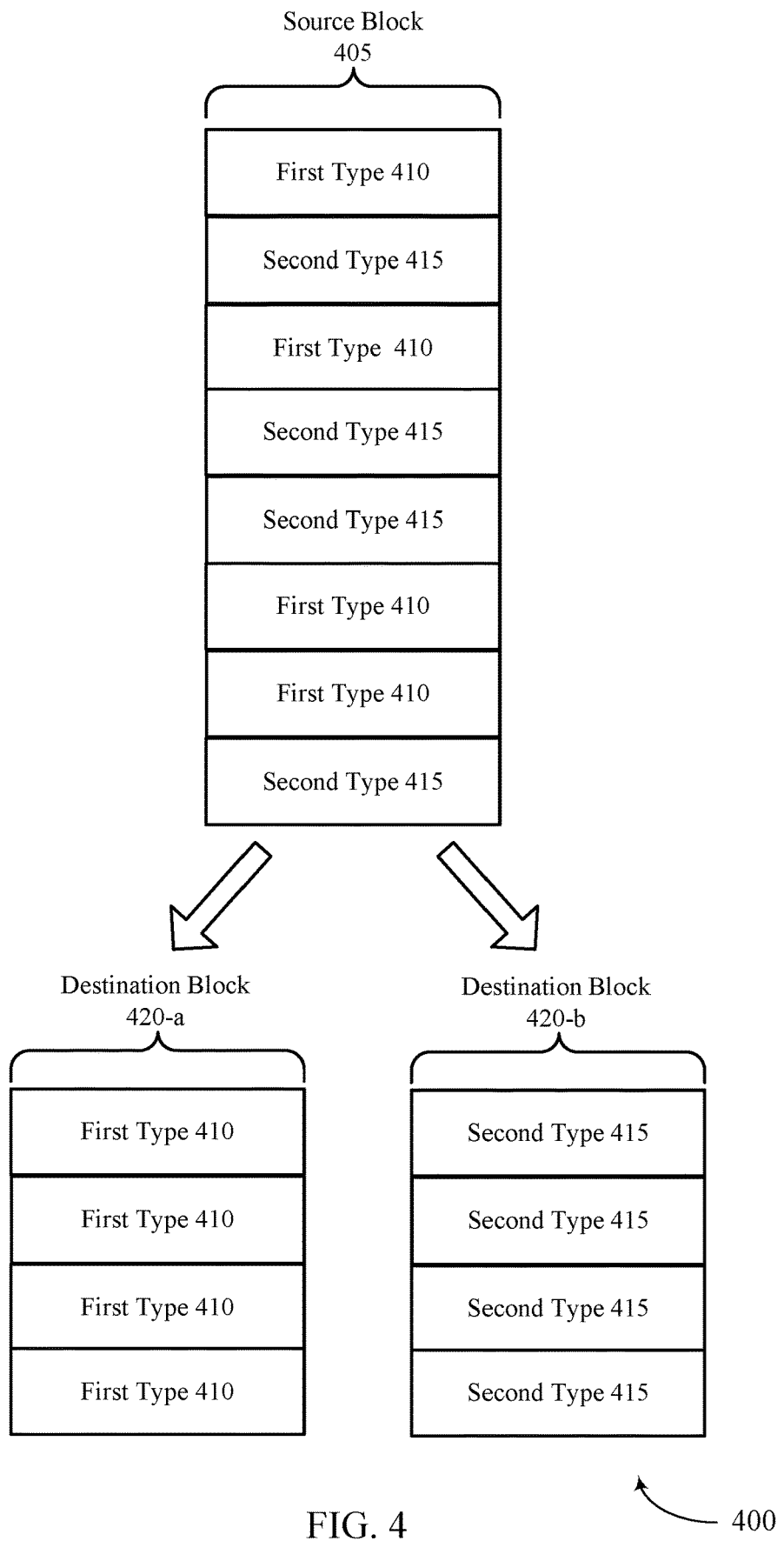
FIG. 4 illustrates an example of a block diagram that supports data separation for garbage collection in accordance with examples as disclosed herein.

FIG. 4 illustrates an example of a block diagram 400 that supports data separation for garbage collection in accordance with examples as disclosed herein. The block diagram may include a source block 405 and destination blocks 420. The source block 405 and destination blocks 420 may include pages identified as a first type 410 or a second type 415.

The memory system may identify the source block 405 for the garbage collection procedure. The source block 405 may include a plurality of pages where the pages may be identified as a first type 410 or a second type 415. For example, the memory system may identify a first set of pages of the source block 405 as the first type 410 associated with a first access frequency. The memory system may identify a second set of pages of the source block 405 as the second type 415 associated with a second access frequency different than the first access frequency. The first type 410 and the second type 415 may be an example of the first type and the second type, respectively, as described with reference to FIG. 3. In some cases, to identify the types (either a first type 410 or a second type 415), the memory system may identify the pages associated with the source block 405, may then identify the translation group with each of the identified pages, and then identify the type (either a first type 410 or a second type 415) associated with the translation group.

After the source block 405 is selected (e.g., identified), the memory system may identify which translation indexes included in the translation groups are part of the management operations. If the identified translation index is included in the translation group and within the queue, the memory system may determine that the data is the second type 415. The memory system may recopy (e.g., transfer) the data associated with the translation indexes not included in the queue (e.g., cold data) to destination block 420-a. The memory system may check other source blocks 405 for the identified translation indexes. In such cases, the memory system may recopy the data in a sequential order.

In a first example, the memory system may copy the valid pages from the source block 405 into the destination block 420-a where the valid pages may be associated with a translation group not included in the queue. In such cases, the pages may be identified as data of the first type 410 (e.g., cold data). The memory system may transfer the first type 410 from the source block 405 to the destination block 420-a. In some cases, the memory system may select destination block 420-a for the garbage collection procedure based on the translation group not being included in the queue (e.g., determining that the translation indexes are unassigned to the translation group in the queue).

In a second example, the memory system may copy the valid pages from the source block 405 into the destination block 420-a or 420-b where the valid pages may be associated with a translation group included in a position of the queue below one or more thresholds. In such cases, the pages may be identified as data of the first type (e.g., cold data) or data of the third type (e.g., warm data) by comparing the positions of the types of data to different thresholds. The memory system may transfer the first type 410 from the source block 405 to the destination block 420-a. The memory system may transfer the third type from the source block 405 to the destination block 420-b. In some cases, the memory system may select the destination block 420-a for the garbage collection procedure based on identifying the pages as the first type.

In a third example, the memory system may copy the valid pages from the source block 405 into the destination block 420-b where the valid pages may be associated with a translation group included in a position of the queue above one or more thresholds. In such cases, the pages may be identified as data of the second type (e.g., hot data). The memory system may transfer the second type 415 from the source block 405 to the destination block 420-b. In some cases, the memory system may select the destination block 420-b for the garbage collection procedure based on identifying the pages as the second type.

In some examples, the destination block 420-a may include data of the first type 410, thereby ensuring that the destination block 420-a includes valid data that may be involved in the garbage collection procedure. The destination block 420-b may include data of the second type 415 which may be overwritten by incoming host data. In such cases, the data of the second type 415 may be invalidated by incoming write operations from the host system rather than becoming invalid data due to a garbage collection procedure. The data of the second type 415 may not be included in destination block 420-b, thereby improving the efficiency of the garbage collection procedure.

In other garbage collection procedures, the memory system may determine which blocks of data may be selected for the garbage collection procedure and select the source block 405 for the garbage collection procedure based determining that the blocks of data include a lower amount of valid data. In such cases, the memory system may copy (e.g., transfer) the valid data from the source block 405 to a destination block 420 without separating the data (e.g., separation of hot and cold data), thereby increasing the amount of management operations and decreasing the overall performance of the memory system.

By implementing a smart garbage collection procedure, the queue may be used during the garbage collection procedure to separate the data based on an access frequency. In such cases, the memory system may avoid or delay operations involving host data because the data identified as the second type 415 (e.g., hot data) may be overwritten by the host system and become invalid data. If the memory system separates the data according to the first type 410 and the second type 415 during the garbage collection procedure, the memory system may store the valid data and avoid mixing the valid data with other data frequently updated, thereby increasing the efficiency of future garbage collection procedures. Sorting data into different blocks based on access frequency parameters may result in less data being part of future garbage collection procedures.

Figure 5:
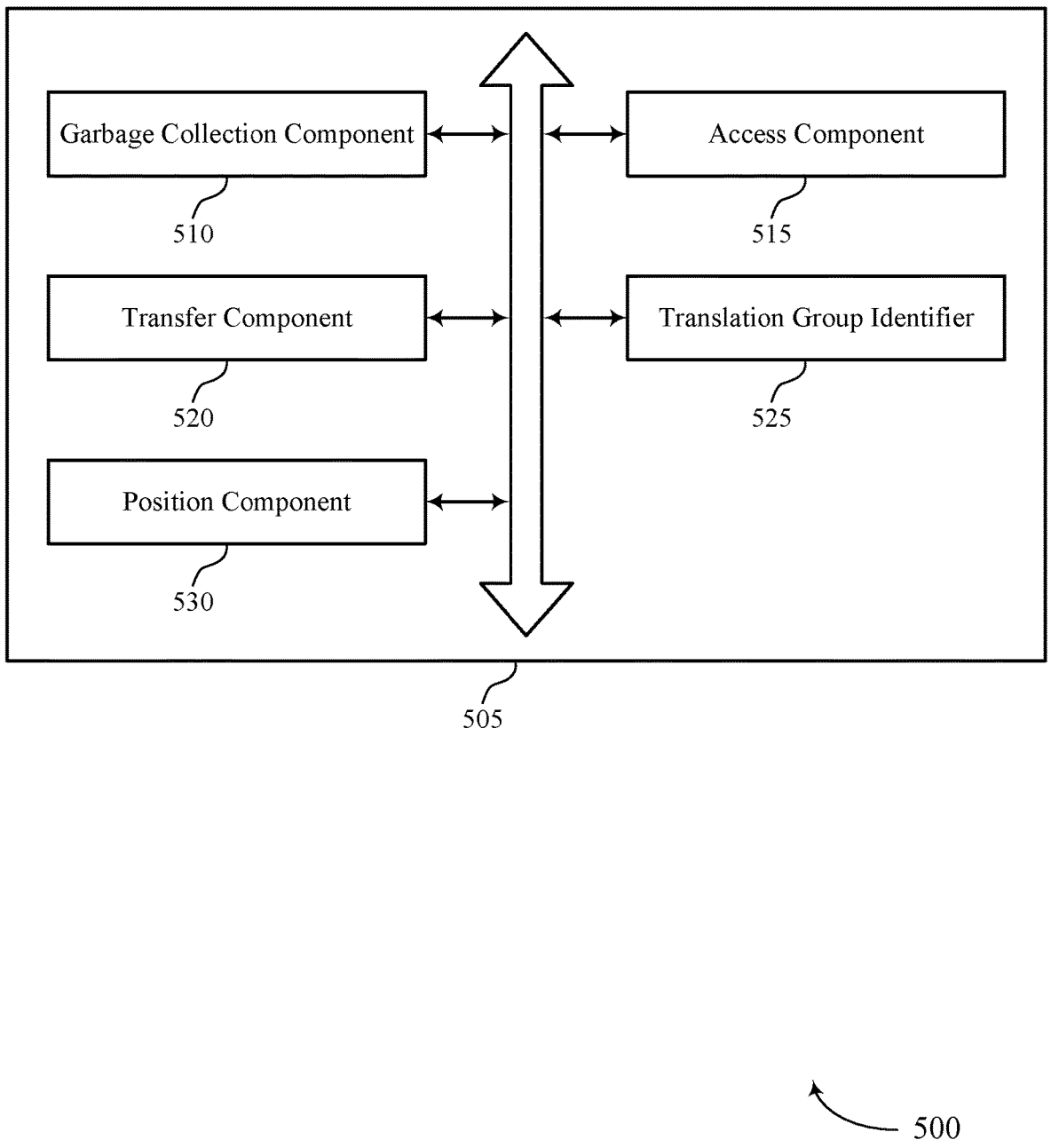
FIG. 5 shows a block diagram of a memory device that supports data separation for garbage collection in accordance with examples as disclosed herein.

FIG. 5 shows a block diagram 500 of a memory system 505 that supports data separation for garbage collection in accordance with examples as disclosed herein. The memory system 505 may be an example of aspects of a memory system as described with reference to FIGS. 1 through 4. The memory system 505 may include a garbage collection component 510, an access component 515, a transfer component 520, a translation group identifier 525, and a position component 530. Each of these modules may communicate, directly or indirectly, with one another (e.g., via one or more buses).

The garbage collection component 510 may identify a source block for a garbage collection operation, the source block including a set of pages. In some examples, the garbage collection component 510 may select the first destination block for the garbage collection operation based on determining that the set of translation indexes are unassigned to the translation group, where transferring the first set of valid pages to the first destination block based on selecting the first destination block.

In some examples, the garbage collection component 510 may select the first destination block for the garbage collection operation based on identifying the first set as the first type, where transferring the first set of valid pages to the first destination block based on selecting the first destination block. In some examples, the garbage collection component 510 may select the second destination block for the garbage collection operation based on identifying the second set as the second type, where transferring the second set of valid pages to the second destination block based on selecting the second destination block.

The access component 515 may identify a first set of valid pages of the source block as a first type associated with a first access frequency parameter and a second set of valid pages of the source block as a second type associated with a second access frequency parameter. In some examples, the access component 515 may access a page of the set of pages based on generating the translation group, where the identifying is based on accessing the page.

In some examples, the access component 515 may determine the first access frequency parameter based on determining that a quantity of times the first set of valid pages is accessed is below an access frequency threshold, where identifying the first set of valid pages as the first type is based on determining the first access frequency parameter. In some examples, the access component 515 may determine the second access frequency parameter based on determining that a quantity of times the second set of valid pages is accessed is above the access frequency threshold, where identifying the second set of valid pages as the second type is based on determining the second access frequency parameter.

In some cases, the first set of valid pages of the first type associated with the first access frequency parameter includes cold data that is accessed less frequently than hot data. In some cases, the second set of valid pages of the second type associated with the second access frequency parameter includes hot data that is accessed more frequently than cold data.

The transfer component 520 may transfer the first set of valid pages to a first destination block as part of the garbage collection operation. In some examples, the transfer component 520 may transfer the second set of valid pages to a second destination block as part of the garbage collection operation.

The translation group identifier 525 may identify one or more translation groups associated with the first set of valid pages and the second set of valid pages, where identifying the first set as the first type and the second set as the second type is based on identifying the one or more translation groups. In some examples, the translation group identifier 525 may determine that one or more translation groups associated with the first set of valid pages and the second set of valid pages are positioned in a queue for identifying the types associated with pages, where identifying the first set as the first type and the second set as the second type is based on the determining.

In some examples, the translation group identifier 525 may generate a translation group including a set of translation indexes, where the set of translation indexes in the translation group are associated with one or more pages. In some examples, the translation group identifier 525 may determine whether the translation group is the first type associated with the first access frequency parameter or the second type associated with the second access frequency parameter based on the repositioning. In some examples, the translation group identifier 525 may determine that the set of translation indexes associated with the one or more pages are unassigned to the translation group in the queue, where identifying the first set as the first type and the second set as the second type is based on the determining.

The position component 530 may identify positions of one or more translation groups associated with the first set of valid pages and the second set of valid pages in a queue for identifying the types associated with pages, where identifying the first set as the first type and the second set as the second type is based on identifying the positions. In some examples, the position component 530 may compare the identified positions in the queue with a threshold, where identifying the first set as the first type and the second set as the second type is based on the comparing. In some examples, the position component 530 may reposition the translation group in a queue including a set of translation groups based on accessing the page.

Figure 6:
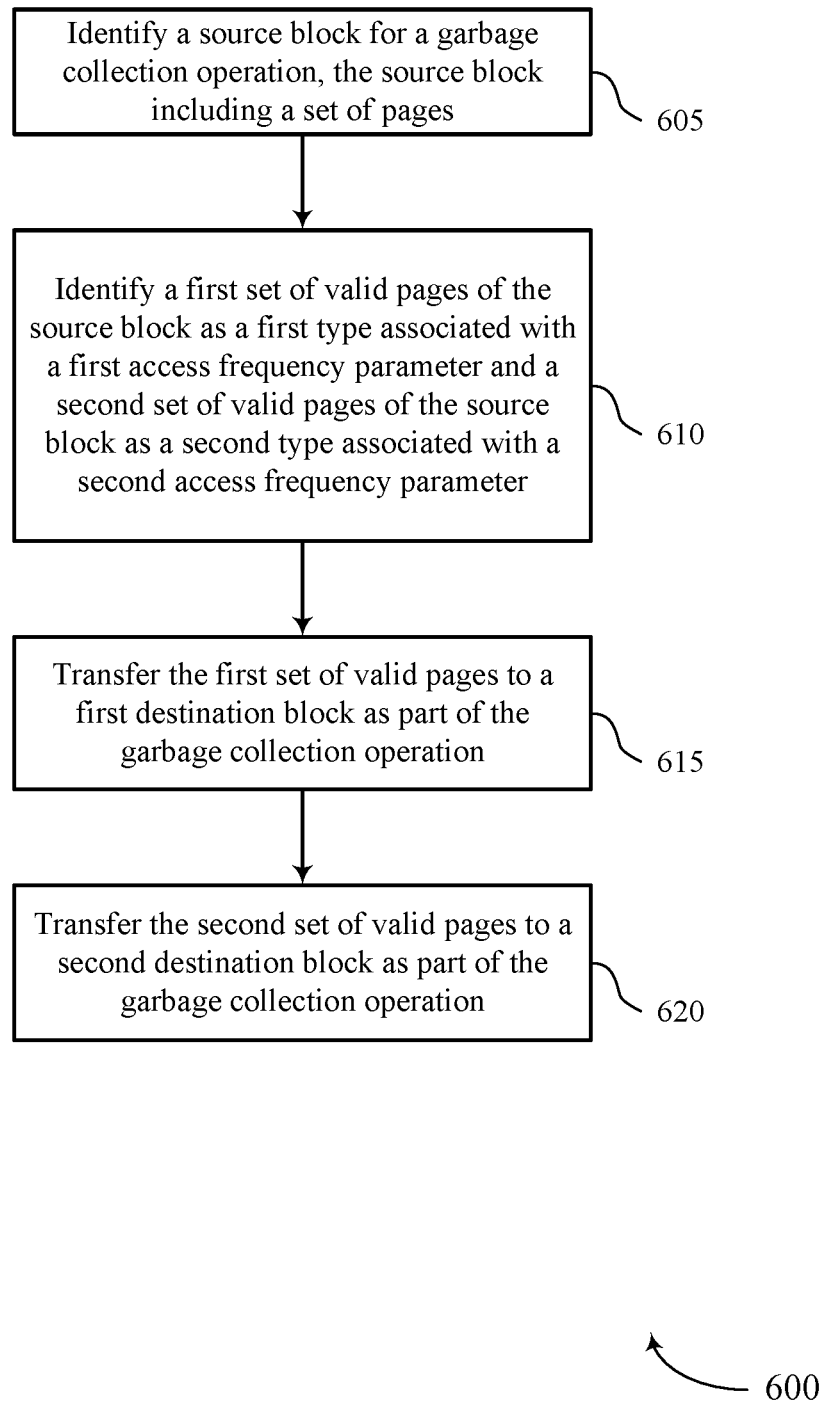
FIG. 6 shows a flowchart illustrating a method or methods that support data separation for garbage collection in accordance with examples as disclosed herein.

FIG. 6 shows a flowchart illustrating a method or methods 600 that supports data separation for garbage collection in accordance with examples as disclosed herein. The operations of method 600 may be implemented by a memory system or its components as described herein. For example, the operations of method 600 may be performed by a memory system as described with reference to FIG. 5. In some examples, a memory system may execute a set of instructions to control the functional elements of the memory system to perform the described functions. Additionally or alternatively, a memory system may perform aspects of the described functions using special-purpose hardware.

At 605, a source block for garbage collection may be identified, where the source block includes a set of pages. For example, memory system may identify a source block for a garbage collection operation. The operations of 605 may be performed according to the methods described herein. In some examples, aspects of the operations of 605 may be performed by a garbage collection component as described with reference to FIG. 5.

At 610, a first set of valid pages of the source block may be identified as a first type associated with a first access frequency parameter and a second set of valid pages of the source block may be identified as a second type associated with a second access frequency parameter may be identified. For example, the memory system may identify a first set of valid pages of the source block as a first type associated with a first access frequency parameter and a second set of valid pages of the source block as a second type associated with a second access frequency parameter. The operations of 610 may be performed according to the methods described herein. In some examples, aspects of the operations of 610 may be performed by an access component as described with reference to FIG. 5.

At 615, the first set of valid pages may be transferred to a first destination block as part of the garbage collection operation. For example, the memory system may transfer the first set of valid pages to a first destination block as part of the garbage collection operation. The operations of 615 may be performed according to the methods described herein. In some examples, aspects of the operations of 615 may be performed by a transfer component as described with reference to FIG. 5.

At 620, the second set of valid pages may be transferred to a second destination block as part of the garbage collection operation. For example, the memory system may transfer the second set of valid pages to a second destination block as part of the garbage collection operation. The operations of 620 may be performed according to the methods described herein. In some examples, aspects of the operations of 620 may be performed by a transfer component as described with reference to FIG. 5.

In some examples, an apparatus as described herein may perform a method or methods, such as the method 600. The apparatus may include features, means, or instructions (e.g., a non-transitory computer-readable medium storing instructions executable by a processor) for identifying a source block for a garbage collection operation, the source block including a set of pages, identifying a first set of valid pages of the source block as a first type associated with a first access frequency parameter and a second set of valid pages of the source block as a second type associated with a second access frequency parameter, transferring the first set of valid pages to a first destination block as part of the garbage collection operation, and transferring the second set of valid pages to a second destination block as part of the garbage collection operation.

Some examples of the method 600 and the apparatus described herein may further include operations, features, means, or instructions for identifying one or more translation groups associated with the first set of valid pages and the second set of valid pages, where identifying the first set as the first type and the second set as the second type may be based on identifying the one or more translation groups.

Some examples of the method 600 and the apparatus described herein may further include operations, features, means, or instructions for determining that one or more translation groups associated with the first set of valid pages and the second set of valid pages may be positioned in a queue for identifying the types associated with pages, where identifying the first set as the first type and the second set as the second type may be based on the determining.

Some examples of the method 600 and the apparatus described herein may further include operations, features, means, or instructions for identifying positions of one or more translation groups associated with the first set of valid pages and the second set of valid pages in a queue for identifying the types associated with pages, where identifying the first set as the first type and the second set as the second type may be based on identifying the positions.

Some examples of the method 600 and the apparatus described herein may further include operations, features, means, or instructions for comparing the identified positions in the queue with a threshold, where identifying the first set as the first type and the second set as the second type may be based on the comparing.

Some examples of the method 600 and the apparatus described herein may further include operations, features, means, or instructions for generating a translation group including a set of translation indexes, where the set of translation indexes in the translation group may be associated with one or more pages.

Some examples of the method 600 and the apparatus described herein may further include operations, features, means, or instructions for accessing a page of the set of pages based on generating the translation group, where the identifying may be based on accessing the page.

Some examples of the method 600 and the apparatus described herein may further include operations, features, means, or instructions for repositioning the translation group in a queue including a set of translation groups based on accessing the page.

Some examples of the method 600 and the apparatus described herein may further include operations, features, means, or instructions for determining whether the translation group may be the first type associated with the first access frequency parameter or the second type associated with the second access frequency parameter based on the repositioning.

Some examples of the method 600 and the apparatus described herein may further include operations, features, means, or instructions for determining that the set of translation indexes associated with the one or more pages may be unassigned to the translation group in the queue, where identifying the first set as the first type and the second set as the second type may be based on the determining.

Some examples of the method 600 and the apparatus described herein may further include operations, features, means, or instructions for selecting the first destination block for the garbage collection operation based on determining that the set of translation indexes may be unassigned to the translation group, where transferring the first set of valid pages to the first destination block based on selecting the first destination block.

Some examples of the method 600 and the apparatus described herein may further include operations, features, means, or instructions for determining the first access frequency parameter based on determining that a quantity of times the first set of valid pages may be accessed may be below an access frequency threshold, where identifying the first set of valid pages as the first type may be based on determining the first access frequency parameter, and determining the second access frequency parameter based on determining that a quantity of times the second set of valid pages may be accessed may be above the access frequency threshold, where identifying the second set of valid pages as the second type may be based on determining the second access frequency parameter.

Some examples of the method 600 and the apparatus described herein may further include operations, features, means, or instructions for selecting the first destination block for the garbage collection operation based on identifying the first set as the first type, where transferring the first set of valid pages to the first destination block based on selecting the first destination block.

Some examples of the method 600 and the apparatus described herein may further include operations, features, means, or instructions for selecting the second destination block for the garbage collection operation based on identifying the second set as the second type, where transferring the second set of valid pages to the second destination block based on selecting the second destination block.

In some examples of the method 600 and the apparatus described herein, the first set of valid pages of the first type associated with the first access frequency parameter includes cold data that may be accessed less frequently than hot data, and the second set of valid pages of the second type associated with the second access frequency parameter includes hot data that may be accessed more frequently than cold data.

It should be noted that the methods described herein are possible implementations, and that the operations and the steps may be rearranged or otherwise modified and that other implementations are possible. Furthermore, portions from two or more of the methods may be combined.

An apparatus is described. The apparatus may include a memory array and a control component coupled with the memory array and configured to cause the apparatus to identify a source block for a garbage collection operation, the source block including a set of pages, identify a first set of valid pages of the source block as a first type associated with a first access frequency parameter and a second set of valid pages of the source block as a second type associated with a second access frequency parameter, transfer the first set of valid pages to a first destination block as part of the garbage collection operation, and transfer the second set of valid pages to a second destination block as part of the garbage collection operation.

Some examples may further include identifying one or more translation groups associated with the first set of valid pages and the second set of valid pages, where identifying the first set as the first type and the second set as the second type may be based on identifying the one or more translation groups.

Some examples may further include determining that one or more translation groups associated with the first set of valid pages and the second set of valid pages may be positioned in a queue for identifying the types associated with pages, where identifying the first set as the first type and the second set as the second type may be based on the determining.

Some examples may further include identifying positions of one or more translation groups associated with the first set of valid pages and the second set of valid pages in a queue for identifying the types associated with pages, where identifying the first set as the first type and the second set as the second type may be based on identifying the positions.

Some examples may further include comparing the identified positions in the queue with a threshold, where identifying the first set as the first type and the second set as the second type may be based on the comparing.

Some examples may further include generating a translation group including a set of translation indexes, where the set of translation indexes in the translation group may be associated with one or more pages.

Some examples may further include accessing a page of the set of pages based on generating the translation group, where the identifying may be based on accessing the page.

Some examples may further include repositioning the translation group in a queue including a set of translation groups based on accessing the page.

Some examples may further include determining whether the translation group may be the first type associated with the first access frequency parameter or the second type associated with the second access frequency parameter based on the repositioning.

Some examples may further include determining that the set of translation indexes associated with the one or more pages may be unassigned to the translation group in the queue, where identifying the first set as the first type and the second set as the second type may be based on the determining.

Some examples may further include selecting the first destination block for the garbage collection operation based on determining that the set of translation indexes may be unassigned to the translation group, where transferring the first set of valid pages to the first destination block based on selecting the first destination block.

Some examples may further include determining the first access frequency parameter based on determining that a quantity of times the first set of valid pages may be accessed may be below an access frequency threshold, where identifying the first set of valid pages as the first type may be based on determining the first access frequency parameter, and determining the second access frequency parameter based on determining that a quantity of times the second set of valid pages may be accessed may be above the access frequency threshold, where identifying the second set of valid pages as the second type may be based on determining the second access frequency parameter.

Some examples may further include selecting the first destination block for the garbage collection operation based on identifying the first set as the first type, where transferring the first set of valid pages to the first destination block based on selecting the first destination block.

Some examples may further include selecting the second destination block for the garbage collection operation based on identifying the second set as the second type, where transferring the second set of valid pages to the second destination block based on selecting the second destination block.

In some examples, the first set of valid pages of the first type associated with the first access frequency parameter includes cold data that may be accessed less frequently than hot data, and the second set of valid pages of the second type associated with the second access frequency parameter includes hot data that may be accessed more frequently than cold data. In some examples, the first set of valid pages of the first type associated with the first access frequency parameter includes hot data that may be accessed more frequently than cold data, and the second set of valid pages of the second type associated with the second access frequency parameter includes cold data that may be accessed more frequently than hot data.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that may, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other cases, the substrate may be a silicon-on-insulator (SOI) substrate, such as silicon-on-glass (SOG) or silicon-on-sapphire (SOS), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that may be accessed by a general purpose or special purpose computer. By way of example, and not limitation, non-transitory computer-readable media may comprise RAM, ROM, electrically erasable programmable read-only memory (EEPROM), compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
   one or more memory devices; and
   processing circuitry coupled with the one or more memory devices and configured to cause the memory system to:
      determine positions of one or more translation groups in a queue associated with a garbage collection operation of a source block of memory cells of the one or more memory devices, wherein the one or more translation groups are associated with a plurality of pages of the source block;
      identify a first set of valid pages of the plurality of pages as a first type associated with a first access frequency and a second set of valid pages of the plurality of pages as a second type associated with a second access frequency based at least in part on the positions of the one or more translation groups in the queue; and
      transfer the first set of valid pages to a first destination block of memory cells of the one or more memory devices and the second set of valid pages to a second destination block of memory cells of the one or more memory devices.

2. The memory system of claim 1, wherein the processing circuitry is further configured to cause the memory system to:
   identify the one or more translation groups, wherein identifying the first set of valid pages as the first type and the second set of valid pages as the second type is based at least in part on identifying the one or more translation groups.

3. The memory system of claim 1, wherein the processing circuitry is further configured to cause the memory system to:
   generate a translation group comprising a plurality of translation indexes, wherein the plurality of translation indexes are associated with one or more pages.

4. The memory system of claim 3, wherein the processing circuitry is further configured to cause the memory system to:
access a page of the plurality of pages based at least in part on generating the translation group, wherein the identifying of the first set of valid pages and the second set of valid pages is based at least in part on accessing the page.

5. The memory system of claim 4, wherein the processing circuitry is further configured to cause the memory system to:
reposition the translation group in the queue based at least in part on accessing the page.

6. The memory system of claim 5, wherein the processing circuitry is further configured to cause the memory system to:
determine whether the translation group is the first type or the second type based at least in part on the repositioning.

7. The memory system of claim 5, wherein the processing circuitry is further configured to cause the memory system to:
determine that at least one translation group is unassigned from the queue, wherein identifying the first set of valid pages as the first type and the second set of valid pages as the second type is based at least in part on the determining that at least the one translation group is unassigned.

8. The memory system of claim 7, wherein the processing circuitry is further configured to cause the memory system to:
select the first destination block based at least in part on determining that at least the one translation group is unassigned, wherein transferring the first set of valid pages to the first destination block is based at least in part on selecting the first destination block.

9. The memory system of claim 1, wherein the processing circuitry is further configured to cause the memory system to:
determine the first access frequency based at least in part on determining that a first quantity of times the first set of valid pages is accessed does not satisfy a threshold, wherein identifying the first set of valid pages as the first type is based at least in part on determining the first access frequency; and
determine the second access frequency based at least in part on determining that a second quantity of times the second set of valid pages is accessed satisfies the threshold, wherein identifying the second set of valid pages as the second type is based at least in part on determining the second access frequency.

10. The memory system of claim 1, wherein the processing circuitry is further configured to cause the memory system to:
select the first destination block based at least in part on identifying the first set of valid pages as the first type, wherein transferring the first set of valid pages to the first destination block is based at least in part on selecting the first destination block.

11. The memory system of claim 1, wherein the processing circuitry is further configured to cause the memory system to:
select the second destination block based at least in part on identifying the second set of valid pages as the second type, wherein transferring the second set of valid pages to the second destination block is based at least in part on selecting the second destination block.

12. The memory system of claim 1, wherein:
the first set of valid pages comprises cold data; and
the second set of valid pages comprises hot data.

13. The memory system of claim 1, wherein the processing circuitry is further configured to cause the memory system to:
compare the determined positions of the one or more translation groups in the queue with a threshold, wherein identifying the first set of valid pages as the first type and the second set of valid pages as the second type is based at least in part on the comparing.

14. A memory system, comprising:
one or more memory devices comprising a plurality of source blocks and a plurality of destination blocks;
a queue coupled with the one or more memory devices, the queue comprising one or more translation groups each associated with a position within the queue, and wherein the one or more translation groups are associated with a plurality of pages of a source block of the plurality of source blocks; and
processing circuitry coupled with the queue and the one or more memory devices, the processing circuitry configured to identify a first set of valid pages of the plurality of pages as a first type associated with a first access frequency and a second set of valid pages of the plurality of pages as a second type associated with a second access frequency based on the positions of the one or more translation groups within the queue, and transfer the first set of valid pages to a first destination block of the plurality of destination blocks and the second set of valid pages to a second destination block of the plurality of destination blocks.

15. The memory system of claim 14, wherein the processing circuitry is further configured to cause the memory system to:
identify the one or more translation groups, wherein identifying the first set of valid pages as the first type and the second set of valid pages as the second type is based at least in part on identifying the one or more translation groups.

16. The memory system of claim 14, wherein the processing circuitry is further configured to cause the memory system to:
identify positions of one or more translation groups associated with the first set of valid pages and the second set of valid pages in the queue for identifying the first type of valid pages and the second type of valid pages; and
compare the identified positions in the queue with a threshold, wherein identifying the first set of valid pages as the first type of valid pages and the second set of valid pages as the second type of valid pages is based at least in part on the comparing.

17. The memory system of claim 14, wherein the processing circuitry is further configured to cause the memory system to:
generate a translation group comprising a plurality of translation indexes, wherein the plurality of translation indexes are associated with one or more pages.

18. The memory system of claim 17, wherein the processing circuitry is further configured to cause the memory system to:
accessing a page of the plurality of pages based at least in part on generating the translation group, wherein identifying the first set of valid pages as the first type and the second set of valid pages as the second type is based at least in part on accessing the page.

19. The memory system of claim 18, wherein the processing circuitry is further configured to cause the memory system to:
reposition the translation group in the queue based at least in part on accessing the page.

20. A memory system, comprising:
one or more memory devices comprising a source block, the source block comprising a plurality of pages; and
processing circuitry coupled with the one or more memory devices and configured to cause the memory system to:
separate the plurality of pages into a first set of valid pages and a second set of valid pages based at least in part on determining positions of one or more translation groups associated with the plurality of pages in a queue; and
transfer data from the first set of valid pages to a first destination block of the one or more memory devices and data from the second set of valid pages to a second destination block of the one or more memory devices based at least in part on determining the first set of valid pages is associated with a first access frequency and the second set of valid pages is associated with a second access frequency.

* * * * *